(12) United States Patent
Hann et al.

(10) Patent No.: US 9,453,521 B1
(45) Date of Patent: Sep. 27, 2016

(54) CLAMP AND METHOD OF USE

(71) Applicant: Vizient, L.L.C., Bettendorf, IA (US)

(72) Inventors: Mark Hann, LeClaire, IA (US); Tyler Schurr, Sherrard, IL (US)

(73) Assignee: Lincoln Global IP

( * ) Notice: Subject to any disclaimer, the term of this patent is extended or adjusted under 35 U.S.C. 154(b) by 943 days.

(21) Appl. No.: 13/731,954

(22) Filed: Dec. 31, 2012

Related U.S. Application Data

(60) Provisional application No. 61/582,119, filed on Dec. 30, 2011.

(51) Int. Cl.
*F16B 2/12* (2006.01)

(52) U.S. Cl.
CPC ...................... *F16B 2/12* (2013.01)

(58) Field of Classification Search
CPC ........... B25B 1/02; B25B 5/02; B25B 1/103; B25B 1/2405; B25B 1/2478; B25B 11/00
See application file for complete search history.

(56) References Cited

U.S. PATENT DOCUMENTS

| | | | |
|---|---|---|---|
| 5,694,042 A | 12/1997 | Eaton et al. | |
| 5,845,897 A * | 12/1998 | Tunkers | B25B 5/122 269/28 |
| 6,498,047 B2 | 12/2002 | Kim et al. | |
| 6,745,633 B2 | 6/2004 | Sasaki et al. | |
| 6,758,098 B1 * | 7/2004 | Nunnelee | B25B 5/101 269/217 |
| 7,735,815 B2 * | 6/2010 | Otten | B25B 5/061 269/266 |
| 2013/0263433 A1 * | 10/2013 | Stoian | B21J 15/02 295/525.06 |
| 2014/0138890 A1 * | 5/2014 | Kawakami | F15B 15/2807 269/27 |

OTHER PUBLICATIONS

Charles J. Murray, "Sensor Ensures Proper Clamp Operation," DesignNews, http://www.designnews.com/author.asp?section_id=1386&doc_id=219120&dfpPParams=ind_184,aid_219120&dfpLayout=blog.
Mark Nunnelee of Drydan Flight Research Center, "Force-Measuring Clamps," http://www.techbriefs.com/index.php?option=com_staticxt&staticfile=/Briefs/Apr03/DRC9937.html.

* cited by examiner

*Primary Examiner* — Lee D Wilson
(74) *Attorney, Agent, or Firm* — Hamilton IP Law, PC; Jay R. Hamilton; Charles A. Damshen

(57) ABSTRACT

A clamp and method of use may be configured to detect whether a clamp is properly secured to an object, and whether that proper securement is maintained. One embodiment of a clamp may include a first portion and a second portion. The relative positions of the first and second portions may be selectively adjusted using a positioner. A sensor assembly may be secured between said first and second portions to determine if the first portion engages the work piece with the proper force. Multiple clamps may be used on a single work piece, and those clamps may be in communication with a common controller to alert the user when any clamp experiences a force other than the force the user desires.

5 Claims, 5 Drawing Sheets

CLAMP AND METHOD OF USE

CROSS-REFERENCE TO RELATED APPLICATIONS

This application claims priority under 35 U.S.C. §119(e) of provisional U.S. Pat. App. Ser. No. 61/582,119 filed on Dec. 30, 2011, which is incorporated by reference herein in its entirety.

FIELD OF THE INVENTION

The present invention relates to an apparatus and method for clamping, and more specifically, for an apparatus and method that verifies an object is properly secured by a clamping apparatus.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.171 (d)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION - ELEMENT LISTING

Figure 1:
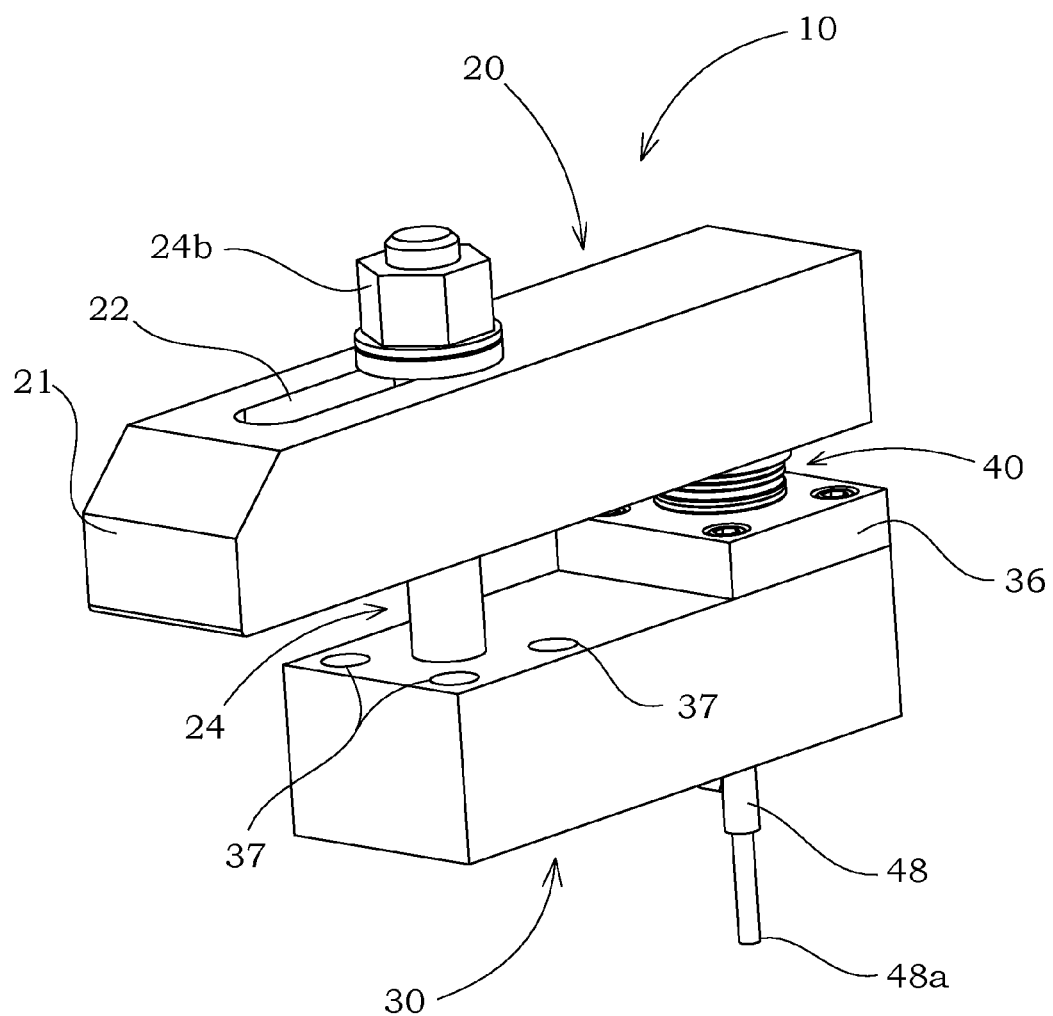
FIG. 1 is a perspective view of an illustrative embodiment of the claim as disclosed herein.

| Description | Element No. |
|---|---|
| Clamp | 10 |
| First portion | 20 |
| Distal end | 21 |
| Interface surface | 21a |
| Aperture | 22 |
| Positioner | 24 |
| Positioner anchor | 24a |
| Positioner adjuster | 24b |
| Pin receptacle | 26 |
| Second portion | 30 |
| Anchor receiver | 32 |
| Sensor chamber | 34 |
| Pin housing | 36 |
| Mounting aperture | 37 |
| Interface chamber | 38 |
| Sensor assembly | 40 |
| Biasing member | 42 |
| Spacer | 44 |
| Pin | 46 |
| Sensor | 47 |
| Coupling | 48 |
| First inlet | 48a |
| Angled inlet | 48b |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

1. Illustrative Embodiment

Figure 2A:
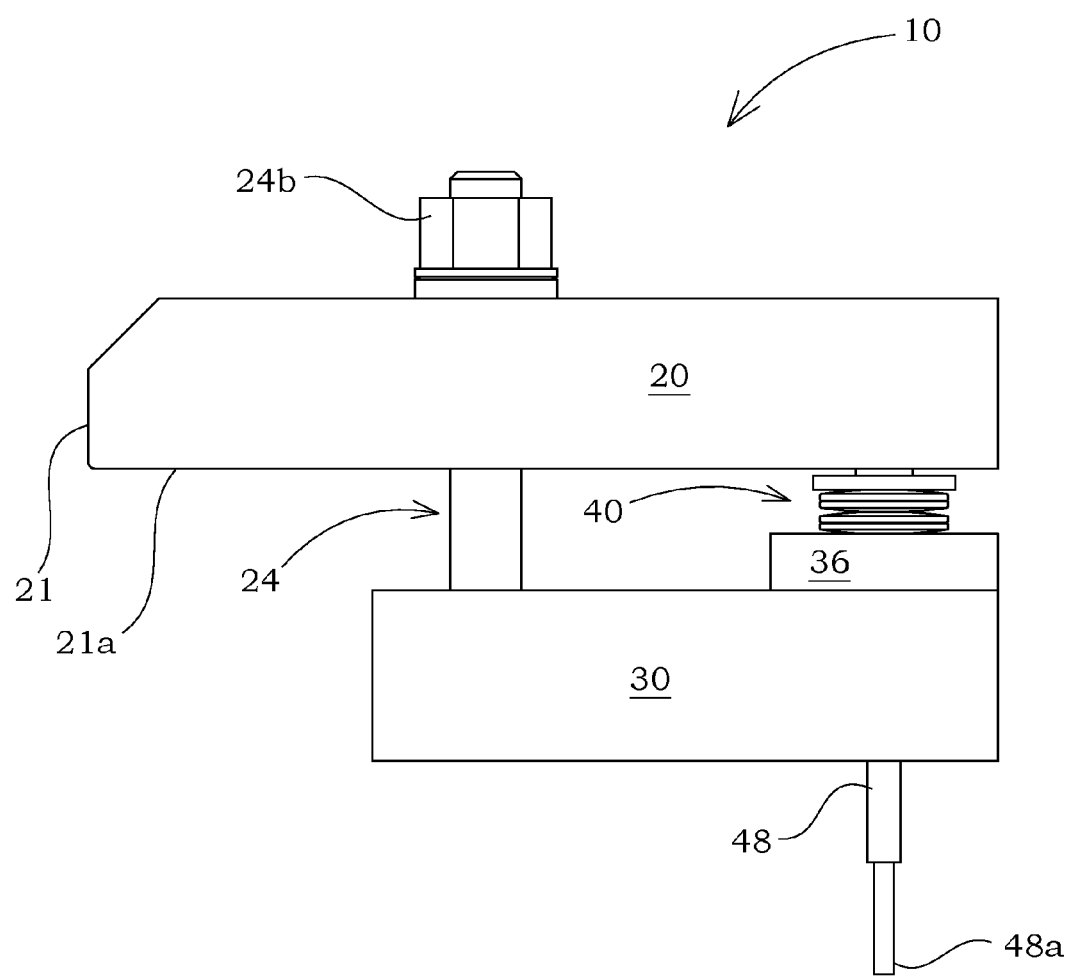
FIG. 2A is a side view of an illustrative embodiment of the clamp as disclosed herein.
Figure 2B:
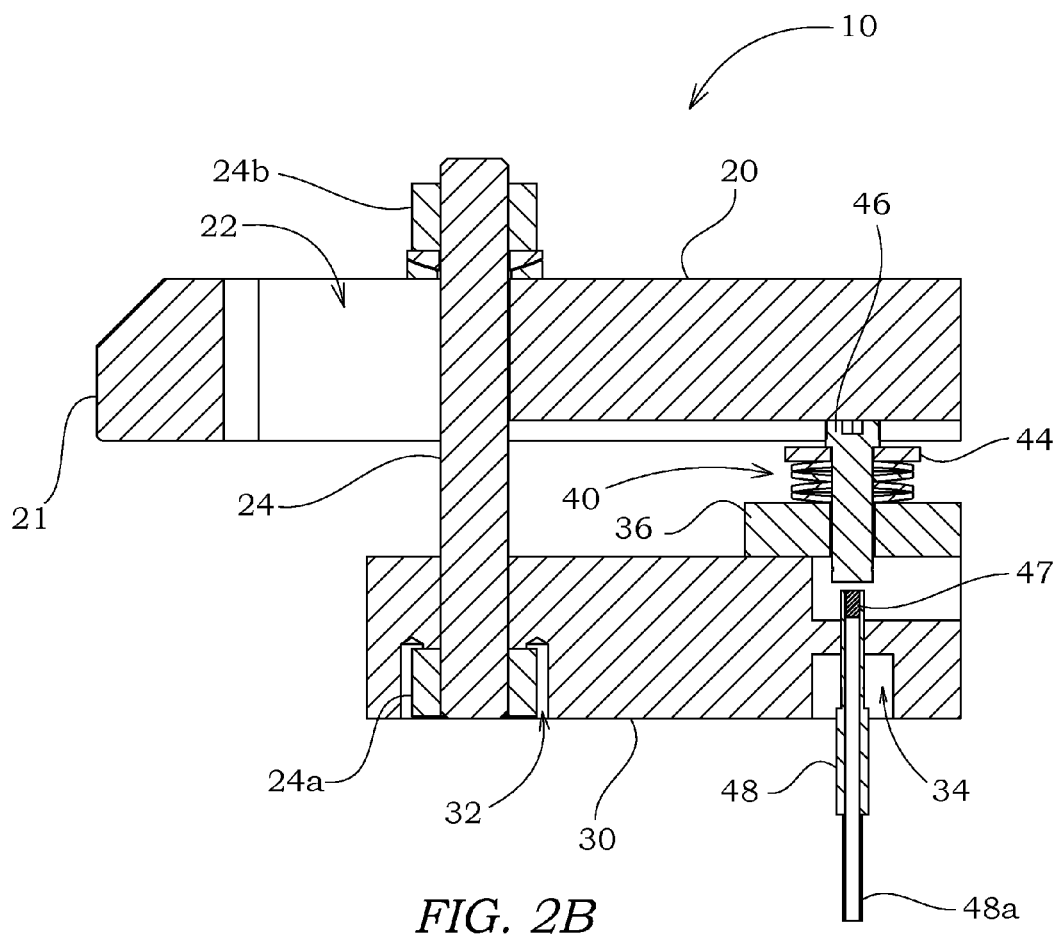
FIG. 2B is a cutaway side view of the embodiment of the clamp shown in FIG. 1.

One embodiment of a clamp 10 is shown in perspective in FIG. 1, and from the side in FIG. 2A. FIG. 2B provides a side cutaway view of the illustrative embodiment along the length thereof. The illustrative embodiment of the clamp 10 generally includes a first portion 20 and a second portion 30 that are selectively positionable with respect to one another. The first and second portions 20, 30 may be coupled via a positioner 24 as shown herein. In other embodiments of the clamp 10, other structures and/or methods may be used to allow for the first portion 20 to be selectively secured in a position relative to the second portion 30 without limitation. A distal end 21 of the first portion 20 may extend beyond the corresponding end of the second portion 30. However, in other embodiments of the clamp 10 the first and second portions 20, 30 are approximately equal in length.

In the illustrative embodiment the positioner 24 includes a positioner adjuster 24b at a first end thereof and a positioner anchor 24a at a second end thereof. A portion of the positioner 24 adjacent the positioner adjuster 24b may pass through an aperture 22 formed in the first portion 20, as best shown in FIGS. 1 & 2B. The aperture 22 may be configured as a slot to allow for various adjustments in the relative position of the first and second portions 20, 30. The positioner anchor 24a may be placed within an anchor receiver 32 formed in the second portion 30, also best shown in FIG. 2B. In this embodiment, the positioner 24 is generally configured as a bolt and nut, wherein the bolt is securely engaged with the second portion 30 and the nut serves as the positioner adjuster 24b, whereby a user may adjust the distance between the first and second portions 20, 30. However, in other embodiments not pictured herein the positioner 24 may use different structures and/or methods to allow a user to adjust the distance between the first and second portions 20, 30.

Figure 3A:
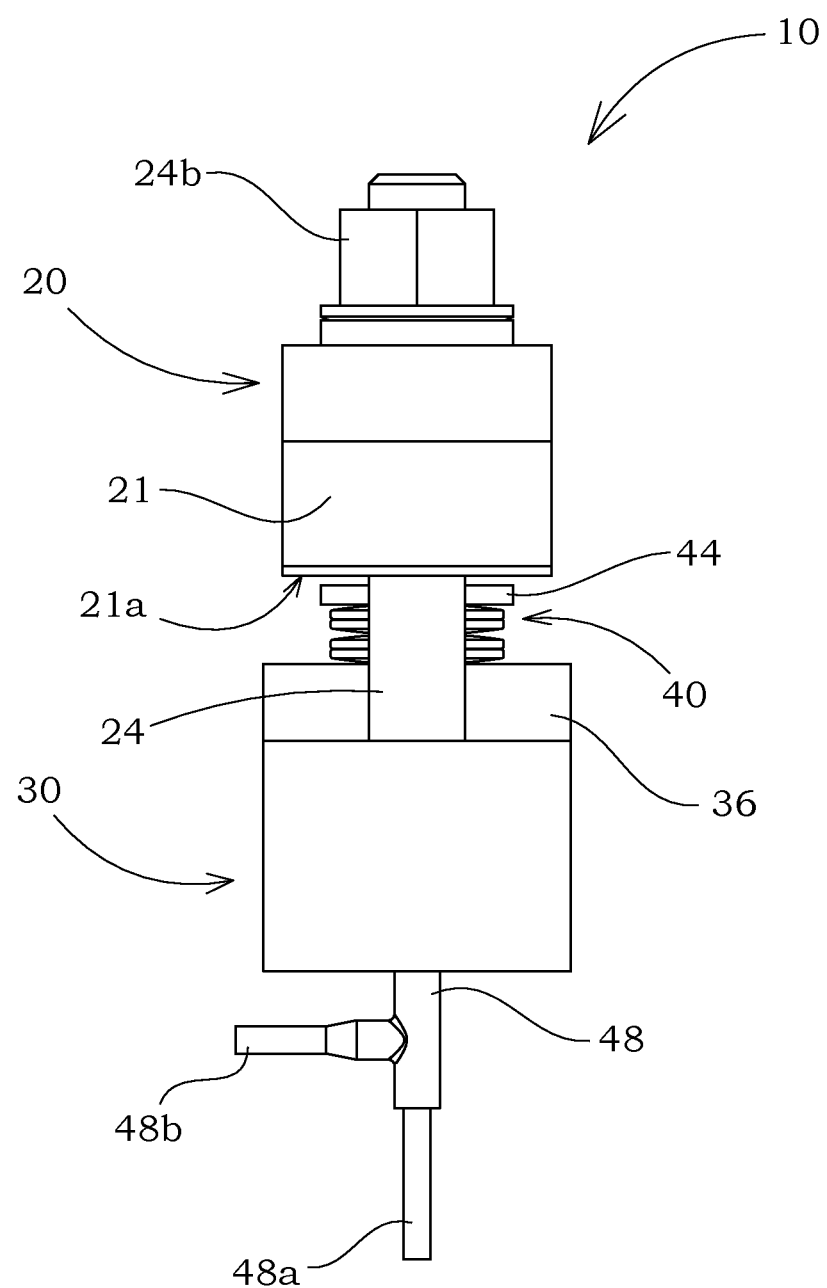
FIG. 3A is an end view of the embodiment of the clamp shown in FIG. 1.
Figure 3B:
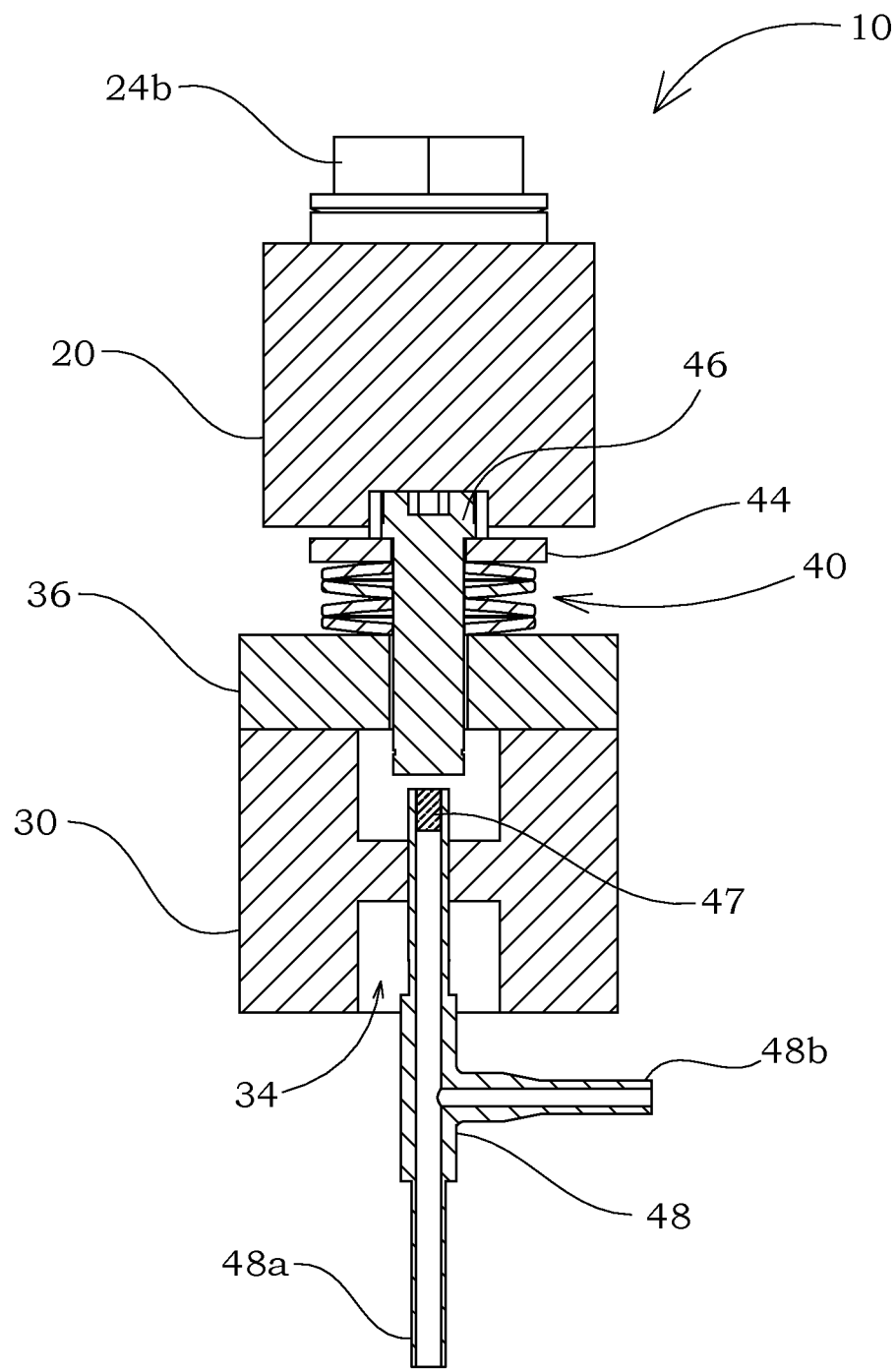
FIG. 3B is a cutaway end view of the embodiment of the clamp shown in FIG. 1.

Referring now generally to FIGS. 2B and 3B, a sensor assembly 40 may also be placed between the first and second portions 20, 30. In the illustrative embodiment the sensor assembly 40 is positioned opposite the distal end 21 of the first portion 20, but may be positioned elsewhere without limitation. In the illustrative embodiment of the clamp 10, the sensor assembly 40 generally includes a biasing member 42, a pin 46, and a sensor 47. The pin 46 may be affixed at one end thereof to the first portion 20 and extend downward through a spacer 44 and a biasing member 42 into a pin housing 36 affixed to the second portion 30. In other embodiments of the clamp 10, the pin housing 36 may be formed integrally within the second portion 30. The pin 46 may be secured to the first portion 20 so that the position of the pin 46 is fixed with respect to the first portion 20. The biasing member 42 may be positioned between the first and second portions 20, 30 concentrically with the pin 46 and spacer 44, which may be positioned between the biasing member 42 and first portion 20. The end of the pin 46 opposite the first portion 20 may extend into an interface chamber 38 formed in the second portion 30.

The second portion 30 may be formed with one or more mounting apertures 37 therein. A mounting aperture 37 may be used to secure the second portion 30 and/or the clamp 10 to a structure and/or work surface, thereby providing a reference position for the clamp 10 and the first portion 20. In other embodiments, the second portion 30 may be secured to a structure and/or work surface via welding. Accordingly, the scope of the clamp 10 is not limited by the method and/or structure used to secure the clamp 10 and/or second portion 30 to a structure and/or work surface, and any suitable structure and/or method may be used without departing from the spirit and scope of the clamp 10.

A first end of a sensor 47 may be positioned within a sensor chamber 34 formed in the second portion 30 such that the position of the sensor 47 with respect to the second portion 30 is fixed. A second end of the sensor 47 may extend toward the interface chamber 38 adjacent the pin 46. It is contemplated that the sensor 47 in the illustrative embodiment of the sensory assembly 40 will be configured as a proximity sensor. Accordingly, the sensor 47 may be used to determine the distance between the first and second portions 20, 30. However, in other embodiments of the clamp 10, the sensor 47 may be configured differently, such as a photo eye, or any other structure and/or method that functions to determine the distance between two objects as described in detail below.

A coupling 48 may be positioned adjacent the sensor 47. In the illustrative embodiment, the coupling is positioned opposite the interface surface 21a toward the bottom of the second portion 30. The coupling 48 may have a first inlet 48a and/or angled inlet 48b to provide a conduit to the sensor 47. For example, the coupling 48 may be used to provide electrical energy to the sensor 47. In other embodiments, the sensor 47 may be wireless, in which case a coupling 48 may not be necessary.

The biasing member 42 may be configured to bias the first portion 20 away from the second portion 30 with a predetermined force for a predetermined clearance between the first and second portions 20, 30. Alternatively, in embodiments of the clamp 10 in which a second portion 30 is not required (described in detail below), the biasing member 42 may be configured to bias the first portion 20 away from the work piece and/or work surface. Decreasing the distance between the first and second portions 20, 30 (via the positioner adjuster 24b in the illustrative embodiment) brings the pin closer to the sensor 47. A certain amount of force will be required to overcome the force of the biasing member 42 in order to bring the pin 46 in sufficient proximity to the sensor 47 such that the sensor 47 detects the presence of the pin 46. In this manner, the biasing member 42, pin 46, and sensor 47 may be configured so that the sensor 47 detects the pin 46 when the clamp 10 has achieved a predetermined clamping force against a work piece (not shown) positioned between the interface surface 21a and work surface (not shown, but for most embodiments generally located under the interface surface 21a adjacent the second portion 30).

Other types of sensor assemblies 40 may be used without limitation, and the optimal sensor assembly 40 and/or components thereof will vary from one application of the clamp 10 to the next. For example, in an embodiment not pictured herein, the sensor assembly 40 may include a strain gauge, and in another embodiment it may include some type of MEMS component. Accordingly, any sensor assembly 40 that alerts a user when a specific clamping force has been achieved, and/or that functions to detect the distance between two objects may be used with the clamp 10 without limitation. Additionally, the optimal forces, pressures, orientations, and/or dimensions of the various components of the clamp 10 will vary from one application of the clamp 10 to the next, and are therefore in no way limiting to the scope thereof. For example, in another embodiment of the clamp 10 not pictured herein, the sensor assembly 40 is positioned adjacent the interface surface 21a such that it may directly detect the relative positions and/or forces of the first portion 20 and work piece. In such an embodiment a second portion 30 may not be needed, and it is contemplated that the positioner 24 may be engaged directly with the work surface.

2. Illustrative Method of Use

Having described a preferred embodiment of the clamp 10 for certain applications, one method of using the clamp 10 will now be described. Generally, the clamp 10 may verify that a user secured a work piece with proper force, and that the proper force is maintained.

In the illustrative embodiment, a work piece may be positioned on a work surface, and the second portion 30 of the clamp 10 may be secured to that work surface. Once the user is satisfied with the position of the work piece, the user may secure the position of the work piece using the clamp 10. The user may decrease the distance between the first portion 20 and the second portion 30 (and consequently the distance between the first portion 20 and the work piece and work surface) via the positioner adjuster 24b. In the illustrative embodiment of the clamp 10 this would be accomplished by tightening a nut (positioner adjuster 24b) engaged with a bolt (positioner 24).

As the distance between the first and second portions 20, 30 is decreased, the biasing member 42 is progressively compressed. Eventually the distance will be decreased to the point that the sensor 47 will detect the pin 46. For a given work piece dimension, the biasing member 42, sensor 47, and pin 46 may be configured so that when the sensor 47 detects the pin 46, the first portion 20 is placing a predetermined force on the work piece. This allows the user to verify that the clamp 10 properly secures the work piece. In a similar fashion, the sensor assembly 40 may also be configured to alert the user if the clamp 10 does not maintain the predetermined force on the work piece, i.e., if the clamp 10 becomes loose or dislodged.

A plurality of clamps 10 may be used on a single work piece, and each clamp 10 may be in communication with a controller (not shown), which controller may be in communication with a machine (e.g., CNC mill, lathe, etc.). The controller may be configured so that if any clamp 10 fails to achieve and/or maintain the proper clamping force, the machine reverts to a fail mode in which no work is performed on the work piece, and in which the work piece cannot be moved or repositioned. The user may be alerted to this situation and inspect and/or adjust each clamp 10 until the proper clamping force is achieved on each clamp 10. It is contemplated that the controller may also be configured to identify the specific clamp 10 that has failed to achieve or maintain the proper clamping force.

Various other electrical components that may be required to facilitate the operation of the clamp 10, such as capacitors, resistors, etc. are not shown herein for purposes of clarity, and are in no way limiting to the scope of the clamp 10.

The clamp 10 and various components thereof may be constructed of any suitable material for the specific application of the clamp 10. It is contemplated that a metallic material and/or metallic alloy for use with the first and second portions 20, 30 may be especially suitable for many applications. However, the scope of the clamp 10 is not so limited.

Having described the preferred embodiments, other features of the clamp 10 and method of use will undoubtedly occur to those versed in the art, as will numerous modifications and alterations in the embodiments as illustrated herein, all of which may be achieved without departing from the spirit and scope of the clamp 10 and/or method of use as disclosed herein. It should be noted that the clamp 10 and method of use are not limited to the specific embodiments pictured and described herein, but are intended to apply to all similar apparatuses and methods for verifying that a specific force has been achieved and/or maintained. Modifications and alterations from the described embodiments will occur to those skilled in the art without departure from the spirit and scope of the clamp 10 and/or method of use.

The invention claimed is:

1. A method for detecting when a clamp is engaged with a work piece at a predetermined force, said method comprising the steps of:
   a. affixing a second portion of said clamp to a work surface, wherein a user desires to fix the position of said work piece with respect to said work surface, and wherein said second portion includes a sensor therein;
   b. positioning said work piece on said work surface;
   c. engaging a first portion of said clamp with said second portion such that said user may securely select the position of said first portion with respect to said second portion;
   d. biasing said first portion away from said second portion by a predetermined force;
   e. moving said first portion until said first portion contacts said work piece; and,
   f. moving said first portion until said sensor indicates said first portion places the appropriate force on said work piece.

2. The method according to claim 1, wherein said method further comprises a plurality of clamps engaging said work piece at different positions of said work piece, wherein a controller is in communication with each said clamp.

3. The method according to claim 1 wherein said first portion further comprises a pin extending toward said sensor.

4. The method according to claim 3 wherein said sensor is further defined as a proximity sensor.

5. The method according to claim 4 wherein said biasing step is further defined as being performed by a spring positioned between said first and second portions adjacent said pin and said sensor such that said sensor detects the presence of said pin when said spring is compressed by a predetermined amount.

* * * * *

UNITED STATES PATENT AND TRADEMARK OFFICE
CERTIFICATE OF CORRECTION

| | | |
|---|---|---|
| PATENT NO. | : 9,453,521 B1 | Page 1 of 1 |
| APPLICATION NO. | : 13/731954 | |
| DATED | : September 27, 2016 | |
| INVENTOR(S) | : Mark Hann et al. | |

It is certified that error appears in the above-identified patent and that said Letters Patent is hereby corrected as shown below:

On the Title Page

In item (73) the Assignee name should be changed to --Lincoln Global, Inc.--

Signed and Sealed this
Thirtieth Day of May, 2017

Michelle K. Lee
*Director of the United States Patent and Trademark Office*